US011939639B2

(12) United States Patent
Seong et al.

(10) Patent No.: US 11,939,639 B2
(45) Date of Patent: Mar. 26, 2024

(54) ULTRA-HIGH-STRENGTH HOT-ROLLED STEEL SHEET, STEEL PIPE, MEMBER, AND MANUFACTURING METHODS THEREFOR

(71) Applicant: POSCO, Pohang-si (KR)

(72) Inventors: Hwan-Goo Seong, Gwangyang-si (KR); Yeol-Rae Cho, Gwangyang-si (KR); Seong-Beom Bae, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 16/957,675

(22) PCT Filed: Dec. 13, 2018

(86) PCT No.: PCT/KR2018/015861
§ 371 (c)(1),
(2) Date: Jun. 24, 2020

(87) PCT Pub. No.: WO2019/132340
PCT Pub. Date: Jul. 4, 2019

(65) Prior Publication Data
US 2020/0362429 A1   Nov. 19, 2020

(30) Foreign Application Priority Data

Dec. 26, 2017   (KR) .................. 10-2017-0179278

(51) Int. Cl.
*C21D 8/02*   (2006.01)
*C21D 9/08*   (2006.01)
(Continued)

(52) U.S. Cl.
CPC .......... *C21D 8/0226* (2013.01); *C21D 9/085* (2013.01); *C21D 9/46* (2013.01); *C22C 38/001* (2013.01);
(Continued)

(58) Field of Classification Search
CPC ........ C21D 8/0226; C21D 9/085; C21D 9/46; C21D 2211/001; C21D 2211/005;
(Continued)

(56) References Cited

U.S. PATENT DOCUMENTS 5,922,145 A * 7/1999 Watari .................... C22C 38/06
148/320
2011/0083774 A1   4/2011 Jin et al.
(Continued)

FOREIGN PATENT DOCUMENTS

CN   105849398 A   8/2016
EP   2952601 A1   12/2015
(Continued)

OTHER PUBLICATIONS

Extended European Search Report dated Oct. 23, 2020 issued in European Patent Application No. 18894148.8.
(Continued)

*Primary Examiner* — Anthony M Liang
(74) *Attorney, Agent, or Firm* — Morgan, Lewis & Bockius LLP

(57) ABSTRACT

A preferable aspect of the present invention provides: an ultra-high-strength hot-rolled steel sheet containing, by weight, one or two of 0.40-0.60% of C, 0.7-1.5% of Mn, 0.3% or less (excluding 0%) of Si, 0.03% or less (including 0%) of P, 0.004% or less (including 0%) of S, 0.04% or less (excluding 0%) of Al, 0.3% or less (excluding 0%) of Cr, 0.3% or less (excluding 0%) of Mo, 0.9-1.5% of Ni, and 0.9-1.5% of Cu, 1.1% or more of Cu+Ni, 0.04% or less (excluding 0%) of Ti, 0.005% or less (excluding 0%) of B, 0.006% or less (excluding 0%) of N, and the balance Fe and other impurities, the alloy elements satisfying relational formulas 1 and 2 below, wherein a microstructure of the hot-rolled steel sheet comprises, by volume, 7% or more of
(Continued)

ferrite and 93% or less of perlite; a steel pipe and a member each using the same; and manufacturing methods therefor. [Relational formula 1] (Mn/Si) #3 (weight ratio) [Relational formula 2] (Ni/Si) #1 (weight ratio)

5 Claims, 5 Drawing Sheets

(51) Int. Cl.
| | |
|---|---|
| C21D 9/46 | (2006.01) |
| C22C 38/00 | (2006.01) |
| C22C 38/02 | (2006.01) |
| C22C 38/04 | (2006.01) |
| C22C 38/06 | (2006.01) |
| C22C 38/10 | (2006.01) |
| C22C 38/12 | (2006.01) |
| C22C 38/28 | (2006.01) |
| C22C 38/32 | (2006.01) |
| C23G 1/00 | (2006.01) |

(52) U.S. Cl.
CPC .......... *C22C 38/002* (2013.01); *C22C 38/02* (2013.01); *C22C 38/04* (2013.01); *C22C 38/06* (2013.01); *C22C 38/105* (2013.01); *C22C 38/12* (2013.01); *C22C 38/28* (2013.01); *C22C 38/32* (2013.01); *C23G 1/00* (2013.01); *C21D 2211/001* (2013.01); *C21D 2211/005* (2013.01); *C21D 2211/008* (2013.01); *C21D 2211/009* (2013.01)

(58) Field of Classification Search
CPC ........ C21D 2211/008; C21D 2211/009; C22C 38/001; C22C 38/002; C22C 38/02; C22C 38/04; C22C 38/06; C22C 38/105; C22C 38/12; C22C 38/28; C22C 38/32; C23G 1/00

See application file for complete search history.

(56) References Cited

U.S. PATENT DOCUMENTS

| | | |
|---|---|---|
| 2011/0253271 A1 | 10/2011 | Kumagai et al. |
| 2013/0160889 A1 | 6/2013 | Aratani et al. |
| 2015/0191805 A1 | 7/2015 | Lee et al. |
| 2015/0368768 A1* | 12/2015 | Aratani ................. C22C 38/001 420/104 |
| 2016/0312331 A1 | 10/2016 | Cho et al. |
| 2016/0312725 A1 | 10/2016 | Edington et al. |
| 2018/0002775 A1* | 1/2018 | Cho ......................... C21D 9/48 |
| 2018/0044748 A1 | 2/2018 | Takagi et al. |

FOREIGN PATENT DOCUMENTS

| | | |
|---|---|---|
| EP | 3239339 A1 | 11/2017 |
| JP | H04-254546 A | 9/1992 |
| JP | H9-41083 A | 2/1997 |
| JP | 2000-144245 A | 5/2000 |
| JP | 2001-200313 A | 7/2001 |
| JP | 2004-332099 A | 11/2004 |
| JP | 2005-205477 A | 8/2005 |
| JP | 2005-281780 A | 10/2005 |
| JP | 2006-265583 A | 10/2006 |
| JP | 2008-081788 A | 4/2008 |
| JP | 4449795 B2 | 4/2010 |
| JP | 2011-099149 A | 5/2011 |
| JP | 2011-149099 A | 8/2011 |
| JP | 2011-523442 A | 8/2011 |
| JP | 2011-236483 A | 11/2011 |
| JP | 2015-160999 A | 9/2015 |
| JP | 2017-179544 A | 10/2017 |
| KR | 10-2009-0124263 A | 12/2009 |
| KR | 10-2012-0123602 A | 11/2012 |
| KR | 10-2014-0021165 A | 2/2014 |
| KR | 10-2014-0080932 A | 7/2014 |
| KR | 10-1461729 A | 11/2014 |
| KR | 10-1568549 B1 | 11/2015 |
| KR | 10-2016-0078850 A | 7/2016 |
| KR | 10-2016-0082602 A | 7/2016 |
| KR | 101665819 B1 * | 10/2016 ............. C21D 6/004 |
| WO | 2009/14556 A2 | 12/2009 |
| WO | 2010/055609 A1 | 5/2010 |
| WO | WO-2016105089 A1 * | 6/2016 ............... C21D 1/00 |
| WO | 2016/147594 A1 | 9/2016 |

OTHER PUBLICATIONS

International Search Report dated Mar. 12, 2019 issued in International Patent Application No. PCT/KR2018/015861 (along with English translation).

Chinese Office Action dated Mar. 29, 2021 issued in Chinese Patent Application No. 201880084182.1.

* cited by examiner

[FIG. 1]
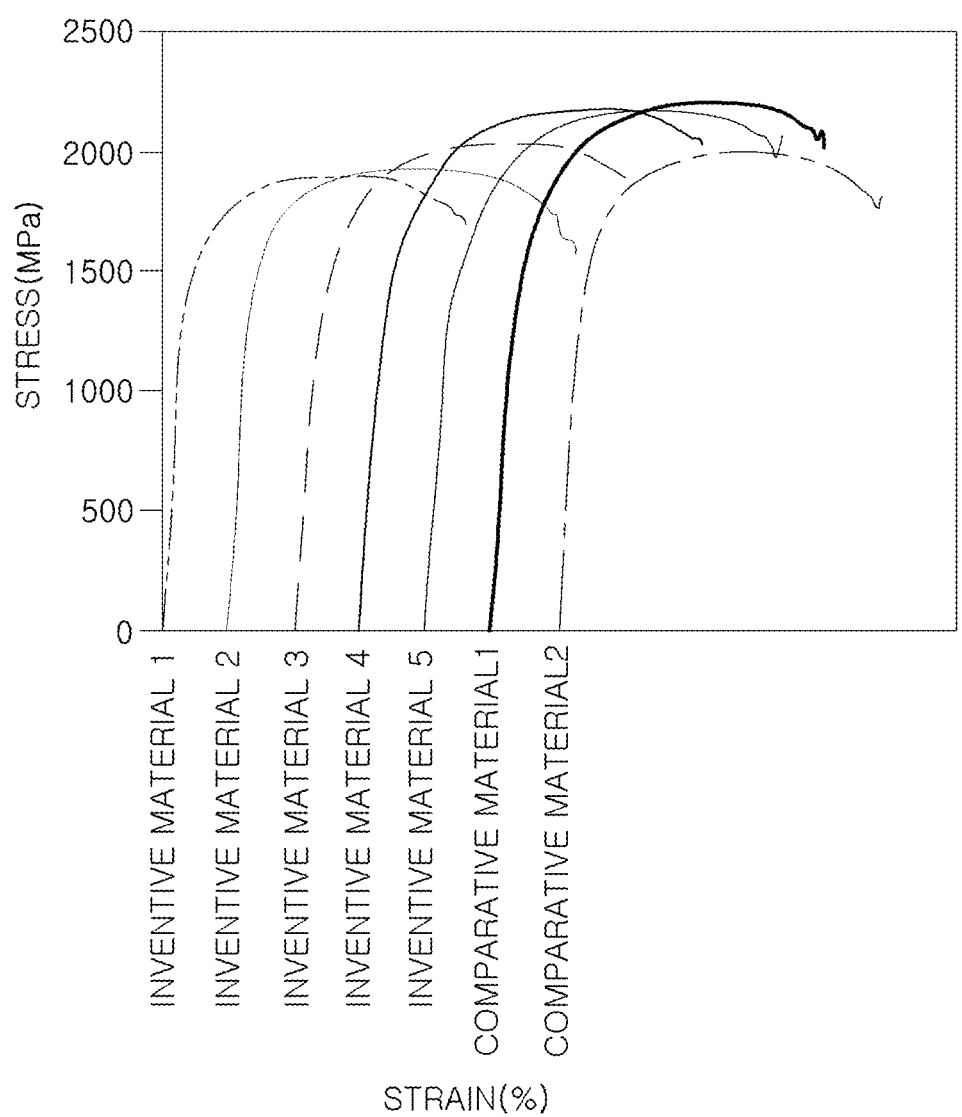

[FIG. 2]
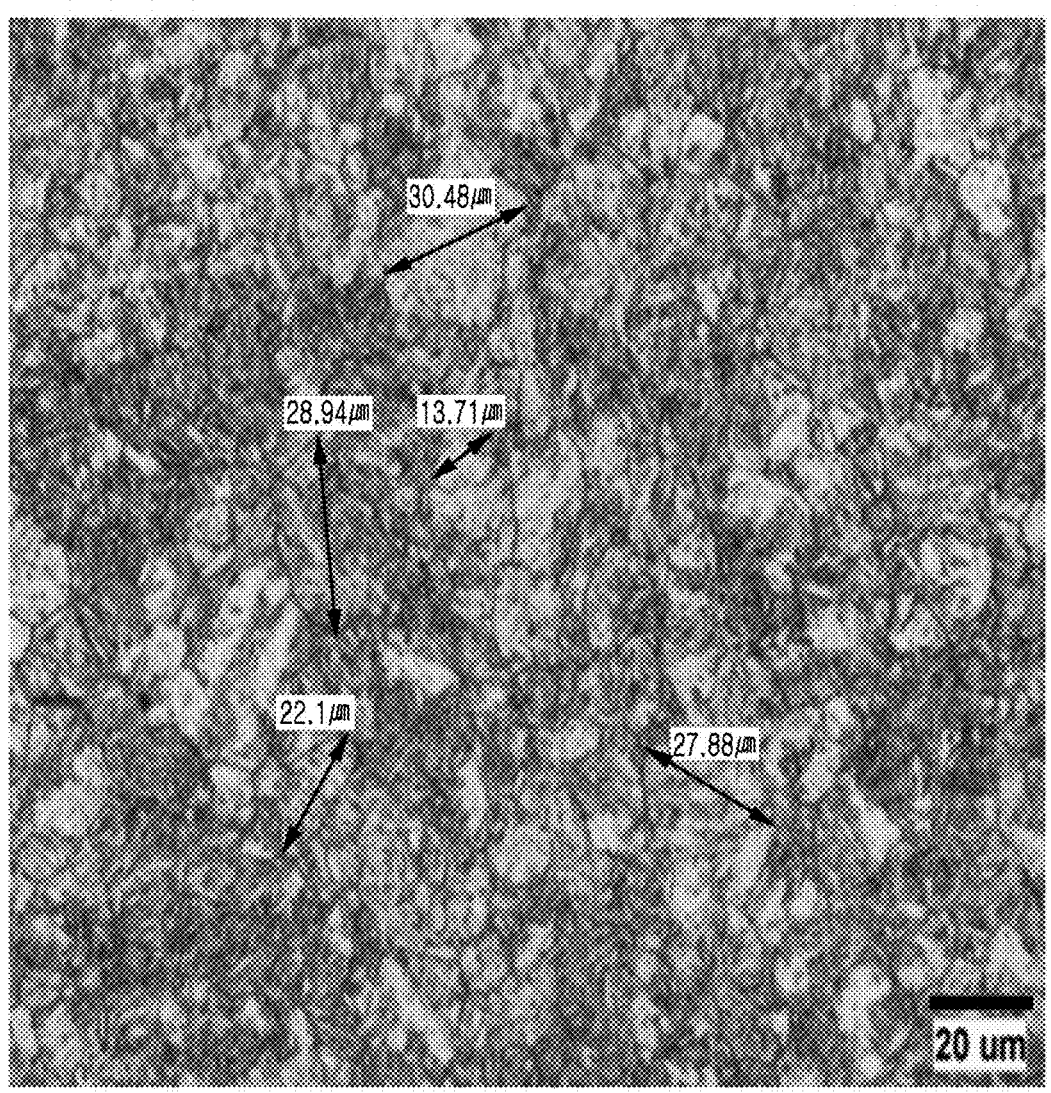

[FIG. 3]
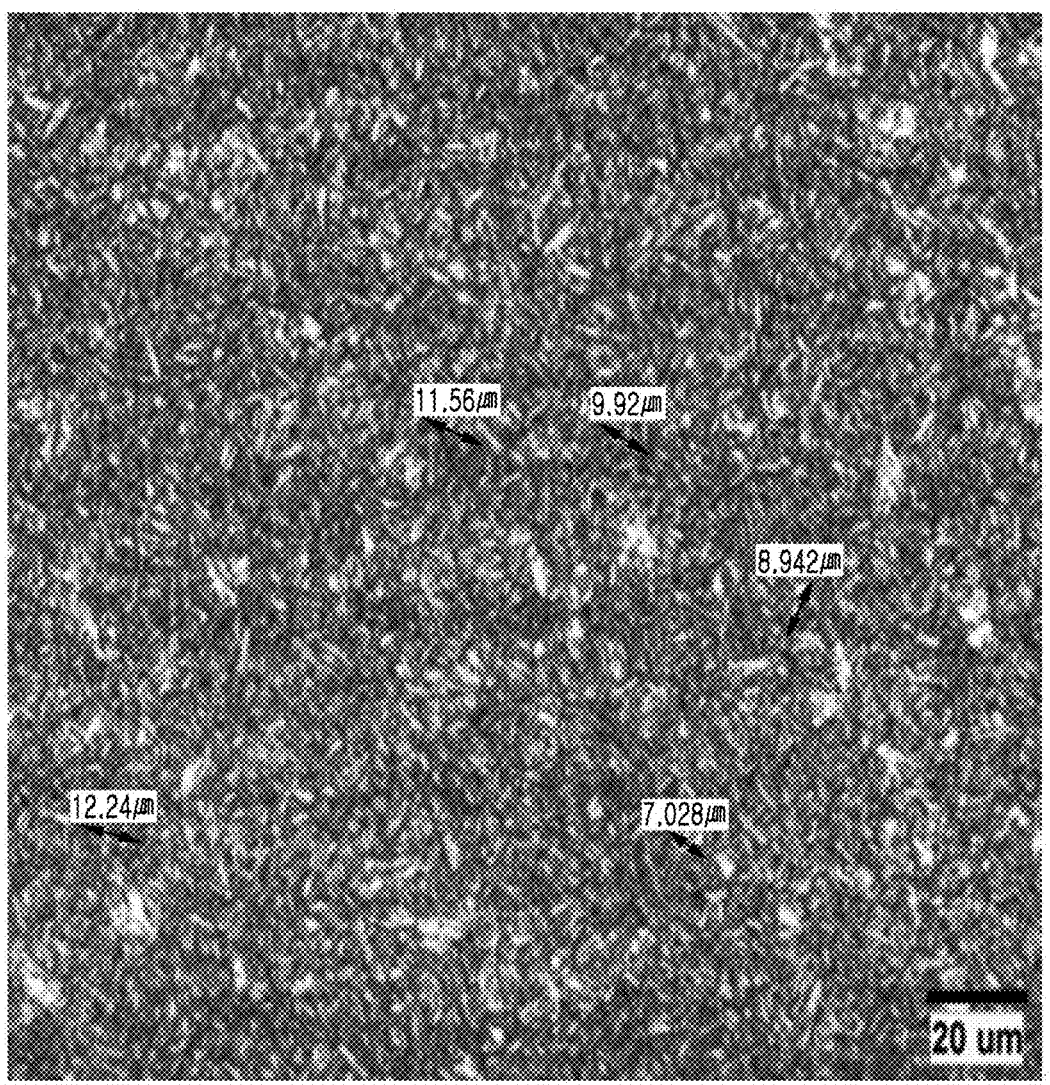

[FIG. 4]
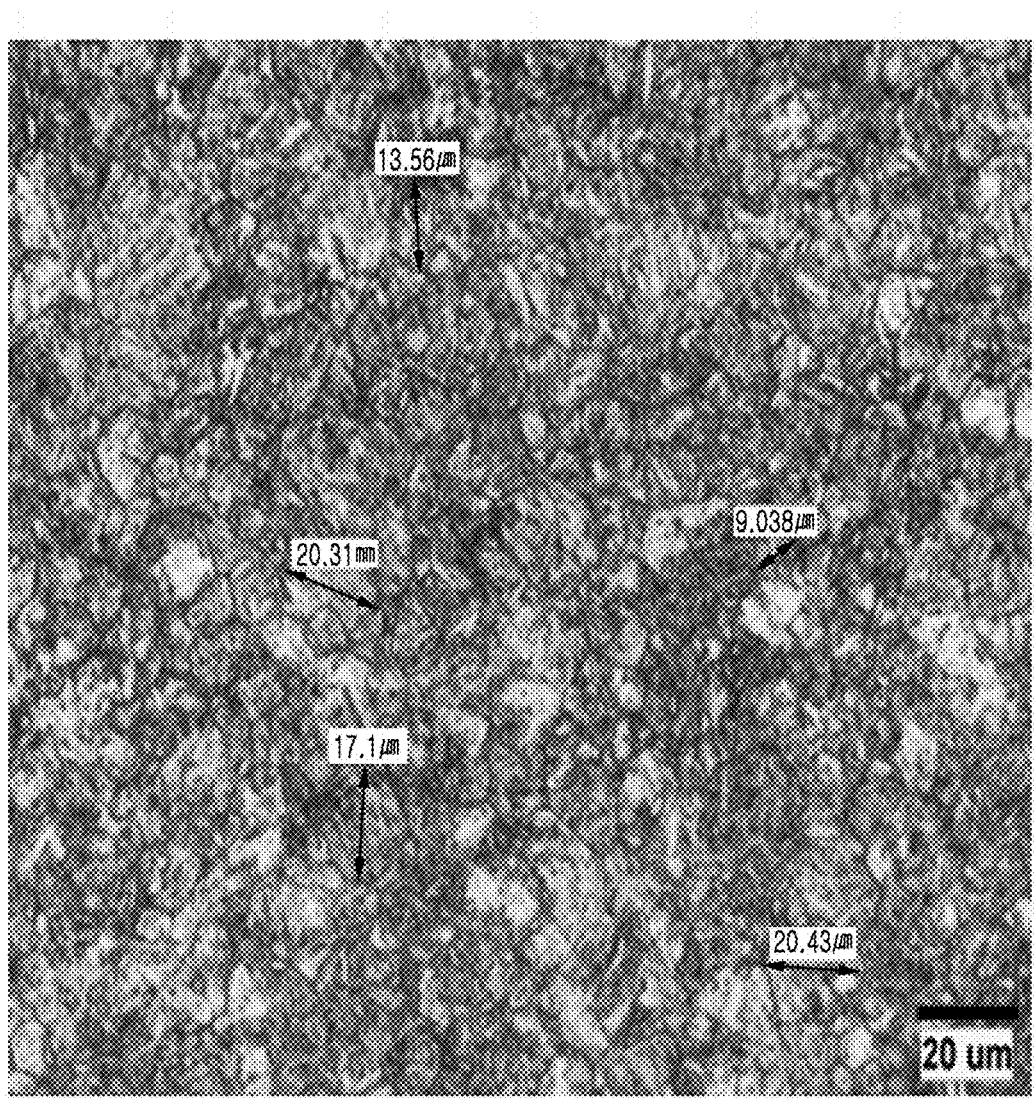

[FIG. 5]
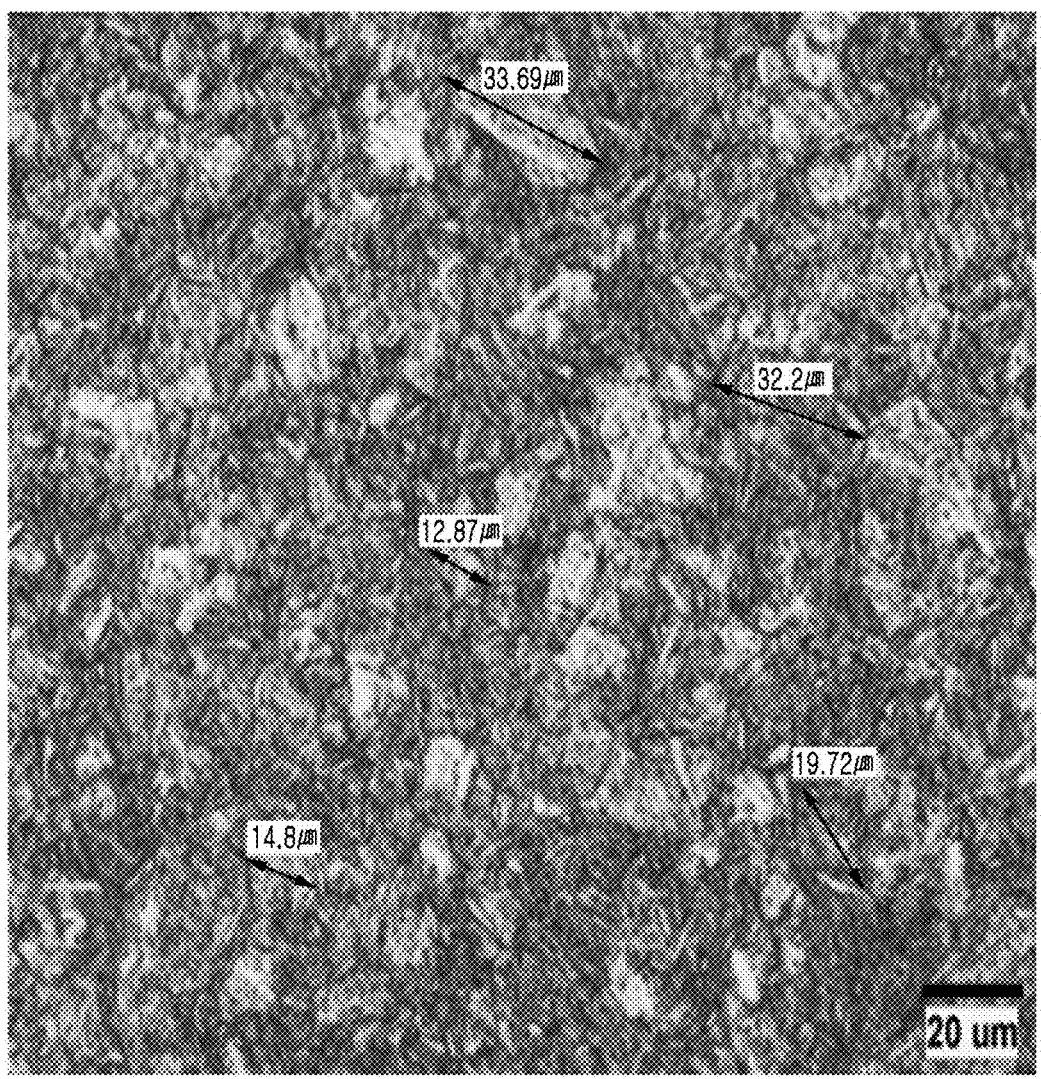

ULTRA-HIGH-STRENGTH HOT-ROLLED STEEL SHEET, STEEL PIPE, MEMBER, AND MANUFACTURING METHODS THEREFOR

CROSS-REFERENCE OF RELATED APPLICATIONS

This application is the U.S. National Phase under 35 U.S.C. § 371 of International Patent Application No. PCT/KR2018/015861, filed on Dec. 13, 2018, which in turn claims the benefit of Korean Application No. 10-2017-0179278, filed on Dec. 26, 2017, the entire disclosures of which applications are incorporated by reference herein.

TECHNICAL FIELD

The present disclosure relates to an ultra-high-strength hot-rolled steel sheet, a steel pipe and a member obtained by using the hot-rolled steel sheet, and a method for manufacturing thereof, which may be used for vehicle components or the like. More specifically, the present disclosure relates to an ultra-high-strength hot-rolled steel sheet having a tensile strength×elongation value of 20,000 MPa % or more, excellent resistance to hydrogen penetration from an external source, and ultra-high-strength after heat treatment, a steel pipe and a member obtained by using the hot-rolled steel sheet, and a method for manufacturing the ultra high strength hot-rolled steel sheet, the steel pipe, and the member.

BACKGROUND ART

In order to enhance safety regulations for vehicle collisions and improve fuel efficiency, light weight and high-strength in vehicle components may be continuously progressed. In general, when strength of a vehicle component material increases, ductility or elongation tends to decrease. In the meantime, many studies have been conducted to simultaneously secure the strength and the ductility, and in most cases, it has been focused on vehicle body components manufactured by a cold forming process. Particularly, a technique using a strain induced martensitic transformation of retained austenite in order to secure high strength and high ductility of the vehicle body components may be common, which is to ensure high strength by cold forming a steel sheet having retained austenite in a certain fraction or more in the final structure of the steel sheet.

Technical descriptions of the specific manufacturing method, e.g., an austempering process or a quenching and partition (Q&P) process may be provided in detail in Patent Document 1. The austempering process maybe performed by adding a large amount of Si, Al, and Mn to low-carbon steel to form austenite during a continuous annealing operation, maintaining the steel at the constant range of a bainite temperature during a cooling operation to suppress precipitation of cementite, and enriching carbon in the steel toward the austenite to retain the austenite at room temperature. In addition, the Q&P process may be performed by continuously annealing steel, quenching the annealed steel to a temperature range below a martensite formation temperature (a quenching temperature range, i.e., a QT range), and raising the temperature again or maintaining the temperature at the QT temperature to redistribute carbon from lath martensite to austenite, thereby retaining austenite between the lath martensite at room temperature. In order to redistribute the carbon in the martensite, it should be raised to a relatively high temperature range or maintained at a high temperature range.

In Patent Document 2, a method comprising heating steel to a high temperature in order to secure high strength and high ductility, cooling the steel to A1 to Ar3 range to perform austenite-ferrite transformation in order to secure a certain fraction of ferrite phase, and quenching non-transformed austenite in the steel to an Ms to Mf temperature range and maintaining at the Ms to Mf temperature range to induce carbon redistribution to secure 3 to 25% retained austenite, has been proposed. However, since it has been suggested that the ferrite phase may be introduced into a final microstructure to secure about 15% of elongation and about 900 to 1200 MPa of tensile strength, it is believed that there will be limitations in securing ultra-high-strength of 1800 MPa or more, along with securing a similar level of elongation.

Therefore, from a review of the method of manufacturing the steel sheet and the steel component proposed in the above-mentioned patent documents, there was no proposal for a hot-rolled steel sheet, a hot-rolled pickled steel sheet, a steel pipe therefrom, and a method for manufacturing the same, having a tensile strength×elongation value of 20,000 MPa % or more, and having excellent resistance to hydrogen penetration from an external source such as a corrosive environment or the like, while having a tensile strength of the steel sheet or the steel component of 1800 MPa or more by the quenching-tempering heat treatment.

(Patent Document 1) Korea Patent Publication No. 2014-0021165
(Patent Document 2) Korea Patent Publication No. 2014-0080932

DISCLOSURE

Technical Problem

A preferred aspect of the present disclosure is to provide a hot-rolled steel sheet having a tensile strength×elongation value of 20,000 MPa % or more, excellent resistance to hydrogen penetration from an external source, and ultra-high-strength after heat treatment.

A preferred aspect of the present disclosure is to provide a method for manufacturing a hot-rolled steel sheet having a tensile strength×elongation value of 20,000 MPa % or more, excellent resistance to hydrogen penetration from an external source, and ultra-high-strength after heat treatment.

A preferred aspect of the present disclosure is to provide a steel pipe prepared using a hot-rolled steel sheet having a tensile strength×elongation value of 20,000 MPa % or more, excellent resistance to hydrogen penetration from an external source, and ultra-high-strength after heat treatment.

A preferred aspect of the present disclosure is to provide a method for manufacturing a steel pipe using a hot-rolled steel sheet having a tensile strength×elongation value of 20,000 MPa % or more, excellent resistance to hydrogen penetration from an external source, and ultra-high-strength after heat treatment.

A preferred aspect of the present disclosure may be to provide a member using a steel pipe prepared using a hot-rolled steel sheet having a tensile strength×elongation value of 20,000 MPa % or more, excellent resistance to hydrogen penetration from an external source, and ultra-high-strength after heat treatment.

A preferred aspect of the present disclosure is to provide a method for manufacturing a member using a steel pipe prepared using a hot-rolled steel sheet having a tensile strength×elongation value of 20,000 MPa % or more, excellent resistance to hydrogen penetration from an external source, and ultra-high-strength after heat treatment.

Technical Solution

According to an aspect of the present disclosure, an ultra-high-strength hot-rolled steel sheet comprising, by weight, C: 0.40 to 0.60%, Mn: 0.7 to 1.5%, Si: 0.3% or less (excluding 0%), P: 0.03% or less (including 0%), S: 0.004% or less (including 0%), Al: 0.04% or less (excluding 0%), Cr: 0.3% or less (excluding 0%), Mo: 0.3% or less (excluding 0%), one or two of Ni: 0.9 to 1.5% and Cu: 0.9 to 1.5%, wherein Cu+Ni: 1.1% or more, Ti: 0.04% or less (excluding 0%), B: 0.005% or less (excluding 0%), N: 0.006% or less (excluding 0%), and a balance of Fe and other impurities, wherein the alloying element satisfies the following relationships 1 and 2, a microstructure comprises, by volume, 7 to 30% of ferrite and 70 to 93% of pearlite, is provided:

(Mn/Si)≥3 (weight ratio)      [Relationship 1]

(Ni/Si)≥1 (weight ratio)      [Relationship 2]

According to an aspect of the present disclosure, a method for manufacturing an ultra-high-strength hot-rolled steel sheet, comprising: heating a steel slab to a temperature within a range of 1150 to 1300° C.; hot-rolling the heated steel slab by using the hot-rolling operation of a rough rolling and a finish rolling at an Ar3 temperature or higher to obtain a hot-rolled steel sheet; and cooling the hot-rolled steel sheet on a run-out table and coiling the cooled hot-rolled steel sheet at a temperature within a range of 550 to 750° C., wherein the steel slab comprises, by weight, C: 0.40 to 0.60%, Mn: 0.7 to 1.5%, Si: 0.3% or less (excluding 0%), P: 0.03% or less (including 0%), S: 0.004% or less (including 0%), Al: 0.04% or less (excluding 0%), Cr: 0.3% or less (excluding 0%), Mo: 0.3% or less (excluding 0%), one or two of Ni: 0.9 to 1.5% and Cu: 0.9 to 1.5%, wherein Cu+Ni: 1.1% or more, Ti: 0.04% or less (excluding 0%), B: 0.005% or less (excluding 0%), N: 0.006% or less (excluding 0%), and a balance of Fe and other impurities, wherein the alloying element satisfies the following relationships 1 and 2, is provided:

(Mn/Si)≥3 (weight ratio)      [Relationship 1]

(Ni/Si)≥1 (weight ratio)      [Relationship 2]

The method may further include pickling the hot-rolled steel sheet to obtain a hot-rolled pickled steel sheet.

According to an aspect of the present disclosure, a steel pipe comprising, by weight, C: 0.40 to 0.60%, Mn: 0.7 to 1.5%, Si: 0.3% or less (excluding 0%), P: 0.03% or less (including 0%), S: 0.004% or less (including 0%), Al: 0.04% or less (excluding 0%), Cr: 0.3% or less (excluding 0%), Mo: 0.3% or less (excluding 0%), one or two of Ni: 0.9 to 1.5% and Cu: 0.9 to 1.5%, wherein Cu+Ni: 1.1% or more, Ti: 0.04% or less (excluding 0%), B: 0.005% or less (excluding 0%), N: 0.006% or less (excluding 0%), and a balance of Fe and other impurities, wherein the alloying element satisfies the following relationships 1 and 2, a microstructure comprises, by volume, 7 to 60% of ferrite and 40 to 93% of pearlite, is provided:

(Mn/Si)≥3 (weight ratio)      [Relationship 1]

(Ni/Si)≥1 (weight ratio)      [Relationship 2]

According to an aspect of the present disclosure, a method for manufacturing a steel pipe, comprising: heating a steel slab to a temperature within a range of 1150 to 1300° C.; hot-rolling the heated steel slab by using the hot-rolling operation of a rough rolling and a finish rolling at an Ar3 temperature or higher to obtain a hot-rolled steel sheet; cooling the hot-rolled steel sheet on a run-out table and coiling the cooled hot-rolled steel sheet at a temperature within a range of 550 to 750° C.; welding the coiled hot-rolled steel sheet to obtain a steel pipe; and annealing the steel pipe, wherein the steel slab comprises, by weight, C: 0.40 to 0.60%, Mn: 0.7 to 1.5%, Si: 0.3% or less (excluding 0%), P: 0.03% or less (including 0%), S: 0.004% or less (including 0%), Al: 0.04% or less (excluding 0%), Cr: 0.3% or less (excluding 0%), Mo: 0.3% or less (excluding 0%), one or two of Ni: 0.9 to 1.5% and Cu: 0.9 to 1.5%, wherein Cu+Ni: 1.1% or more, Ti: 0.04% or less (excluding 0%), B: 0.005% or less (excluding 0%), N: 0.006% or less (excluding 0%), and a balance of Fe and other impurities, wherein the alloying element satisfies the following relationships 1 and 2, is provided:

(Mn/Si)≥3 (weight ratio)      [Relationship 1]

(Ni/Si)≥1 (weight ratio)      [Relationship 2]

The method may further include drawing the annealed steel pipe, after the annealing.

According to an aspect of the present disclosure, a member comprising, by weight, C: 0.40 to 0.60%, Mn: 0.7 to 1.5%, Si: 0.3% or less (excluding 0%), P: 0.03% or less (including 0%), S: 0.004% or less (including 0%), Al: 0.04% or less (excluding 0%), Cr: 0.3% or less (excluding 0%), Mo: 0.3% or less (excluding 0%), one or two of Ni: 0.9 to 1.5% and Cu: 0.9 to 1.5%, wherein Cu+Ni: 1.1% or more, Ti: 0.04% or less (excluding 0%), B: 0.005% or less (excluding 0%), N: 0.006% or less (excluding 0%), and a balance of Fe and other impurities, wherein the alloying element satisfies the following relationships 1 and 2, a microstructure comprises, by volume, 90% or more of one or two of martensite and tempered martensite, and 10% or less retained austenite, is provided:

(Mn/Si)≥3 (weight ratio)      [Relationship 1]

(Ni/Si)≥1 (weight ratio)      [Relationship 2]

According to an aspect of the present disclosure, a method for manufacturing a member, comprising: heating a steel slab to a temperature within a range of 1150 to 1300° C.; hot-rolling the heated steel slab by using the hot-rolling operation of a rough rolling and a finish rolling at an Ar3 temperature or higher to obtain a hot-rolled steel sheet; cooling the hot-rolled steel sheet on a run-out table and coiling the cooled hot-rolled steel sheet at a temperature within a range of 550 to 750° C.; welding the coiled hot-rolled steel sheet to obtain a steel pipe; annealing and drawing the steel pipe; hot-forming the drawn steel pipe to obtain a member; and quenching or quenching and tempering the member, wherein the steel slab comprises, by weight, C: 0.40 to 0.60%, Mn: 0.7 to 1.5%, Si: 0.3% or less (excluding 0%), P: 0.03% or less (including 0%), S: 0.004% or less (including 0%), Al: 0.04% or less (excluding 0%), Cr: 0.3% or less (excluding 0%), Mo: 0.3% or less (excluding 0%), one or two of Ni: 0.9 to 1.5% and Cu: 0.9 to 1.5%, wherein Cu+Ni: 1.1% or more, Ti: 0.04% or less (excluding 0%), B: 0.005% or less (excluding 0%), N: 0.006% or less (excluding 0%), and a balance of Fe and other impurities, wherein the alloying element satisfies the following relationships 1 and 2, is provided:

(Mn/Si)≥3 (weight ratio)      [Relationship 1]

(Ni/Si)≥1 (weight ratio)      [Relationship 2]

Advantageous Effects

According to a preferred aspect of the present disclosure, after heating-quenching-tempering heat treatment, a steel sheet and a steel pipe having a tensile strength×elongation value of 20,000 or more and excellent resistance to hydrogen penetration in a corrosive environment may be manufactured. In addition, in an in-service operation of steel pipe components, an inhibitory effect on hydrogen penetration, that may invade from an external source, may be exerted.

DESCRIPTION OF DRAWINGS

FIG. 1 is a tensile curve of Inventive Materials 1 to 5 and Comparative Materials 1 and 2 in the Example.

FIG. 2 is an optical microscope photograph for the microstructure of Inventive Material 1 in the Example.

FIG. 3 is an optical microscope photograph for the microstructure of Inventive Material 2 in the Example.

FIG. 4 is an optical microscope photograph for the microstructure of Comparative Material 1 in the Example.

FIG. 5 is an optical microscope photograph for the microstructure of Comparative Material 2 in the Example.

BEST MODE FOR INVENTION

Hereinafter, the present disclosure will be described.

First, an ultra-high-strength hot-rolled steel sheet according to a preferred aspect of the present disclosure will be described.

The ultra-high-strength hot-rolled steel sheet according to a preferred aspect of the present disclosure may include, by weight, C: 0.40 to 0.60%, Mn: 0.7 to 1.5%, Si: 0.3% or less (excluding 0%), P: 0.03% or less (including 0%), S: 0.004% or less (including 0%), Al: 0.04% or less (excluding 0%), Cr: 0.3% or less (excluding 0%), Mo: 0.3% or less (excluding 0%), one or two of Ni: 0.9 to 1.5% and Cu: 0.9 to 1.5%, wherein Cu +Ni: 1.1% or more, Ti: 0.04% or less (excluding 0%), B: 0.005% or less (excluding 0%), N: 0.006% or less (excluding 0%), and a balance of Fe and other impurities, and the alloy element may satisfy the following relationships 1 and 2.

(Mn/Si)≥3 (weight ratio)    [Relationship 1]

(Ni/Si)≥1 (weight ratio)    [Relationship 2]

C: 0.40 to 0.60% by weight (hereinafter also referred to as "%")

Carbon (C) may be an effective element for increasing strength of steel and may increase the strength of steel after quenching heat treatment. When the content thereof is less than 0.40%, it may be difficult to secure sufficient strength of 1800 Mpa or more after tempering heat treatment. When the content thereof exceeds 0.60%, martensite having excessive hardness may be formed, which may degrade fatigue durability due to occurrence of cracking of steel sheet material or steel pipe components. Therefore, it is desirable to limit the carbon (C) content to 0.40 to 0.60%.

Mn: 0.7 to 1.5%

Manganese (Mn) may be an essential element for increasing strength of steel and may increase the strength of steel after quenching heat treatment. When the content thereof is less than 0.7%, it may be difficult to secure sufficient strength of 1800 Mpa or more after tempering heat treatment. When the content thereof exceeds 1.5%, segregation zones may be formed inside and/or outside of a continuous casting slab and a hot-rolled steel sheet, and poor processing may be frequently performed during the manufacture of steel pipe. In addition, fatigue durability may be deteriorated due to an increase in strength after excessive tempering heat treatment. Therefore, it is desirable to limit the manganese (Mn) content to 0.7 to 1.5%.

Si: 0.3% or less (excluding 0%)

Silicon (Si) maybe an element added to improve strength or ductility, and may be added in a range in which there is no problem of surface scale occurrence of a hot-rolled steel sheet and a hot-rolled pickled steel sheet. When the content thereof is more than 0.3%, removal by pickling may be difficult due to the occurrence surface defects resulted from the formation of silicon oxide. Therefore, the content may be limited to 0.3% or less (excluding 0%).

P: 0.03% or less (including 0%)

Phosphorus (P) may be segregated at grain boundaries and/or interphase grain boundaries of austenite to cause brittleness. Therefore, the content of phosphorus (P) should be kept low, and an upper limit thereof may be limited to 0.03%. The preferred content of phosphorus (P) is 0.02% or less. In the present disclosure, the existence of the S element rather than the P content maybe confirmed at a site of generating quench cracks in steel during quenching, so that P content may be controlled less strictly. By the way, in an operation of drawing a pipe, as P element remains during the improper pickling after pipe phosphate ($H_3PO_4$) treatment performed for scale removal, so that the remaining P element may cause defects in an inner wall of the steel pipe. Therefore, the content of the P element may be controlled to be possibly low.

S: 0.004% or less (including 0%)

Sulfur (S) may be segregated in an MnS nonmetallic inclusion in steel or in solidification during a continuous casting process to cause high temperature cracking. In addition, since impact toughness of a heat-treated steel sheet or steel pipe maybe deteriorated, the content thereof may be controlled to be possibly low. Therefore, in the present disclosure, the sulfur (S) content may be kept as low as possible, and an upper limit thereof may be limited to 0.004%.

Al: 0.04% or less (excluding 0%)

Aluminum (Al) may be an element added as a deoxidizer. The aluminum (Al) maybe reacted with nitrogen (N) in the steel to precipitate AlN. When producing a thin slab, slab cracks may be caused under cast steel cooling conditions when the precipitate is precipitated, to deteriorate quality of the cast steel or a hot-rolled steel sheet. Therefore, the content of aluminum (Al) remains as low as possible, and may be limited to 0.04% or less (excluding 0%).

Cr: 0.3% or less (excluding 0%)

Chromium (Cr) may be an element for delaying ferrite transformation of austenite to increase quenchability and improve heat treatment strength during quenching heat treatment of steel. When the content thereof in steel containing 0.35% or more of carbon (C) exceeds 0.3% or more, excessive quenchability of the steel maybe caused. Therefore, the content thereof may be limited to 0.3% or less (excluding 0%).

Mo: 0.3% or less (excluding 0%)

Molybdenum (Mo) may increase quenchability of steel and may form fine precipitates to refine a crystal grain of austenite. In addition, although it may be effective in improving strength and toughness of the steel after heat treatment of the steel, its manufacturing cost may increase when the content thereof exceeds 0.3%. Therefore, the content thereof may be limited to 0.3% or less (excluding 0%).

In the present disclosure, one or two of Ni and Cu may be contained.

Ni: 0.9 to 1.5%

Nickel (Ni) may be an element that simultaneously increases quenchability and toughness of steel. In the present disclosure, when tensile properties are evaluated after heat treatment of a steel sheet or a steel pipe with an increased nickel (Ni) content in base composition, strength after the heat treatment may decrease with an increase in the Ni content. In this connection, it is believed to promote movement of dislocation introduced in the martensite. When the content thereof is less than 0.9%, it may be difficult to simultaneously secure a strength-elongation balance of 20,000 or more and resistance to hydrogen penetration in a corrosive environment. When the content thereof exceeds 1.5%, manufacturing costs of the steel sheet may rapidly increase, and weldability for manufacturing the steel pipe may be also degraded, despite the above advantages. Therefore, the nickel (Ni) content may be limited to 0.9 to 1.5%.

Cu: 0.9 to 1.5%

Copper (Cu) may be an alloying element that increases corrosion resistance of steel and effectively increases quenching and quenching-tempering strength after heat treatment. When the content thereof is less than 0.9%, it may be difficult to satisfy a strength-elongation balance of 20,000 or more. When the content thereof exceeds 1.5%, cracks may be generated in a hot-rolled steel sheet to decrease a yielding percentage in manufacturing the steel sheet, strength of the steel sheet after heat treatment may rapidly increase to increase cracking, or the strength after the heat treatment may rapidly increase to decrease toughness.

Therefore, the copper (Cu) content may be limited to 0.9 to 1.5%.

Since the copper (Cu) element itself may generate surface cracks in slabs or hot-rolled steel sheets, the copper (Cu) element may be used with the nickel (Ni) element, rather than the use of the copper (Cu) element itself.

Ni+Cu: 1.1% or more

The sum of the content of Cu+Ni may be important to simultaneously secure a strength-elongation balance of 20,000 or more of a steel sheet and a pipe component, and resistance to hydrogen penetration in a corrosive environment.

In the present disclosure, when less than 1.1% of the sum of the content of Cu+Ni is added to carbon steel having a carbon equivalent of 0.65 or more (Ceq), it may be difficult to secure the above effects at the same time. Therefore, the sum of the content of Cu+Ni may be set to 1.1% or more.

Ti: 0.04% or less (excluding 0%)

Titanium (Ti) may be an element forming a precipitate (TiC, TiCN, or TiNbCN) in a hot-rolled steel sheet and suppresses the growth of austenite grains to increase the strength of the hot-rolled steel sheet. When the content exceeds 0.04%, it may increase strength of the quenching-tempering heat-treated steel, and may be effective in trapping diffusible hydrogen at a TiN interface. In this case, when present in a form of coarse crystallites, rather than fine precipitates, in the hot-rolled steel sheet, toughness may be poor, or it may be acted as a starting point for generating fatigue cracks to deteriorate fatigue durability of the heat-treated steel sheet or steel pipe components. Therefore, the titanium (Ti) content may be limited to 0.04% or less.

B: 0.005% or less (excluding 0%)

Boron (B) may be a beneficial element that greatly increases hardenability of steel even at its low content. When added in an appropriate amount, formation of ferrite may be suppressed and hardenability may effectively increase. When contained in an excessive amount, a recrystallization temperature of austenite may increase and weldability may deteriorate. When the boron (B) content exceeds 0.005%, the effects maybe saturated or it may be difficult to secure proper strength and toughness. Therefore, the content thereof may be limited to 0.005% or less. More preferably, 0.003% or less may be effective in simultaneously securing strength and toughness of heat-treated steel.

N: 0.006% or less (excluding 0%)

Nitrogen (N) maybe an element that stabilizes austenite and forms nitride. When the nitrogen (N) content exceeds 0.006% or more, coarse AIN nitride may be formed to act as a starting point for generating fatigue cracks in evaluating durability of a heat-treated steel sheet or steel pipe components, to deteriorate fatigue durability. In addition, when the boron (B) element may be added together, it may be necessary to control the nitrogen (N) content as low as possible to increase the effective boron (B) content. Therefore, the nitrogen (N) content may be limited to 0.006% or less.

The Mn and Si should satisfy the following relationship 1.

$(Mn/Si) \geq 3$     [Relationship 1]

An Mn/Si ratio may be an important parameter for determining quality of a welded portion in a steel pipe. When the Mn/Si ratio is less than 3, the Si content maybe relatively high, and silicon oxide may be formed in a molten metal of the welded portion. In this case, the formed silicon oxide is not forcibly discharged, a defect may be formed in the welded portion, to cause defective steel pipes. Therefore, it is desirable to limit the Mn/Si ratio to 3 or more.

The Ni and Si should satisfy the following relationship 2.

$(Ni/Si) \geq 1$     [Relationship 2]

The Ni/Si ratio may be an important parameter that affects quenching strength of steel due to quenching heat treatment or tempering strength of steel due to quenching-tempering heat treatment. The present disclosure may be characterized in that the content of the nickel (Ni) element may be relatively large than the content of the silicon (Si) element. When the Ni/Si ratio is less than 1, the steel may have a relatively high content of the silicon (Si) to relatively increase strength of a hot-rolled steel sheet. Therefore, deformation resistance of a material against hot-rolling may increase. For example, it may be difficult to manufacture a hot-rolled steel sheet having a thickness of less than 3 mm. When the Ni/Si ratio is 1 or more, the Ni content may be relatively high to relatively decrease strength of the hot-rolled steel sheet. Therefore, since quenching strength and quenching-tempering strength may be relatively small, elongation of the hot-rolled steel sheet or pipe components may advantageously increase. In addition, since a fraction of retained austenite remaining in a tempered martensitic structure according to quenching-tempering heat treatment may be relatively small, it is considered that the content of diffusible hydrogen trapped at an austenite/base iron interface may be relatively small, whereas resistance to hydrogen penetration may be excellent because relatively high amounts of hydrogen penetrating into the heat-treated steel sheet or steel pipe components may be blocked. Further, an increase of the retained austenite content in the tempered martensite may be one factor in reducing durability of steel. Therefore, the Ni/Si ratio may be limited to 1 or more.

In the present disclosure, remaining components, except for the above components, may be composed of Fe and other impurities.

An ultra-high-strength hot-rolled steel sheet according to a preferred aspect of the present disclosure may have a microstructure comprising, by volume, 7 to 30% of ferrite and 70 to 93% of pearlite.

When a fraction of the ferrite is less than 7%, the content of the pearlite may increase to increase strength. Therefore, for example, it may be difficult to manufacture a thin steel sheet having a thickness of 3 mm or less. Therefore, it is desired to limit the fraction of the ferrite to 7% or more.

A preferred fraction of the ferrite may be 10 to 30%.

The hot-rolled steel sheet may have a thickness of 2 to 7 mm.

The hot-rolled steel sheet may have a tensile strength of 600 to 1000 Mpa.

Hereinafter, a method of manufacturing an ultra-high-strength hot-rolled steel sheet according to a preferred aspect of the present disclosure will be described.

The method of manufacturing the ultra-high-strength hot-rolled steel sheet according to a preferred aspect of the present disclosure may include heating a steel slab to a temperature within a range of 1150 to 1300° C.; hot-rolling the heated steel slab by using the hot-rolling operation of a rough rolling and a finish rolling at an Ar3 temperature or higher to obtain a hot-rolled steel sheet; and cooling the hot-rolled steel sheet on a run-out table and coiling the cooled steel sheet at a temperature within a range of 550 to 750° C., wherein the steel slab may include, by weight, C: 0.40 to 0.60%, Mn: 0.7 to 1.5%, Si: 0.3% or less (excluding 0%), P: 0.03% or less (including 0%), S: 0.004% or less (including 0%), Al: 0.04% or less (excluding 0%), Cr: 0.3% or less (excluding 0%), Mo: 0.3% or less (excluding 0%), one or two of Ni: 0.9 to 1.5% and Cu: 0.9 to 1.5%, wherein Cu+Ni: 1.1% or more, Ti: 0.04% or less (excluding 0%), B: 0.005% or less (excluding 0%), N: 0.006% or less (excluding 0%), and a balance of Fe and other impurities, wherein the alloying element may satisfy the following relationships 1 and 2:

$$(Mn/Si) \geq 3 \text{ (weight ratio)} \quad [\text{Relationship 1}]$$

$$(Ni/Si) \geq 1 \text{ (weight ratio)} \quad [\text{Relationship 2}]$$

Heating of Steel Slab

The steel slab formed as described above may be heated to a temperature within a range of 1150 to 1300° C.

The heating the steel slab to a temperature within a range of 1150 to 1300° C. may be to ensure uniform structure and component distribution in the steel slab. When the steel slab heating temperature is lower than 1150° C., precipitates formed in the steel slab during a continuous casting process may not secure non-solid solution and component uniformity. When the steel slab heating temperature is higher than 1300° C., it may be difficult to secure a target material and surface quality of the hot-rolled steel sheet because an excessive increase in decarburization depth and grain growth may occur. Therefore, the steel slab heating temperature may be limited to a temperature within a range of 1150 to 1300° C.

Preparation of Hot-Rolled Steel Sheet

The heated steel slab may be hot-rolled by using the hot-rolling operation of a rough rolling and a finish rolling at an Ar3 temperature or higher to obtain a hot-rolled steel sheet.

The hot-rolling may be performed at an Ar3 temperature or higher. When the hot-rolling is performed at a temperature less than an Ar3 temperature, a portion of austenite may undergo ferrite transformation. Therefore, deformation resistance of a material against hot-rolling may become poor to deteriorate threading ability including straightness of the steel sheet, to increase possibility for generating defects in an operation such as plate breakage or the like. Particularly, when the finish rolling temperature exceeds 950° C., scale defects or the like may occur. Therefore, it is desired to limit the finish rolling temperature to 950° C. or less.

Coiling

As described above, the hot-rolled steel sheet obtained by the hot-rolling operation may be cooled on a run-out table and coiled at a temperature within a range of 550 to 750° C.

After the hot-rolling operation, cooling on the run-out table and coiling at a temperature within a range of 550 to 750° C. may be to secure a uniform material of the hot-rolled steel sheet. When the coiling temperature is lower than 550° C., a low temperature transformation phase such as bainite or martensite may be introduced into an edge portion of the steel sheet in a width direction. Therefore, since strength of the steel sheet may increase rapidly, a variation in hot-rolled strength may increase in the width direction.

When the coiling temperature exceeds 750° C., internal oxidation may be promoted in a surface layer portion of the steel sheet. Therefore, surface defects such as cracks or surface irregularities may occur on a surface after the hot-rolling and pickling operation. In addition, coarsening of the pearlite may cause a variation in surface hardness of the steel sheet. Therefore, a temperature range to be coiled after the cooling of the hot-rolled steel sheet may be limited to a temperature within a range of 550 to 750° C.

In the present disclosure, the hot-rolled steel sheet manufactured as described above maybe additionally pickled to produce a hot-rolled pickled steel sheet. The pickling process maybe not limited to a specific process, since any process may be used as long as the process is generally used in a hot-rolling pickling operation.

According to a method of manufacturing an ultra-high-strength hot-rolled steel sheet according to a preferred aspect of the present disclosure, it may be possible to manufacture a hot-rolled steel sheet having a microstructure comprising, by volume, 7 to 30% of ferrite and 70 to 93% of pearlite.

The hot-rolled steel sheet may have a thickness of 2 to 7 mm.

The hot-rolled steel sheet may have a tensile strength of 600 to 1000 Mpa.

Hereinafter, a steel pipe and a method of manufacturing the same according to another preferred aspect of the present disclosure will be described.

The steel pipe according to another preferred aspect of the present disclosure may be manufactured by using the hot-rolled steel sheet of the present disclosure described above, and may have the alloy composition of the hot-rolled steel sheet of the present disclosure described above, and a microstructure comprising, by volume, 7 to 60% of ferrite and 40 to 93% of pearlite. When a fraction of ferrite is less than 7%, an area fraction of pearlite may be too high, and it may be difficult to secure roundness due to difficulty in reducing diameter by cold drawing of the steel pipe. When a fraction of ferrite exceeds 60%, a spherical $Fe_3C$ phase may grow non-uniformly due to application of a high annealing temperature. In this case, it may act as a crack site that may be propagated to the crack along an interface of the non-uniform coarse $Fe_3C$ phases in a reducing diameter process by subsequent cold drawing. Therefore, a fraction of ferrite may be 7 to 60%, and preferably 20 to 60%.

A method of manufacturing a steel pipe according to another preferred aspect of the present disclosure may be a method of manufacturing a steel pipe using a hot-rolled steel sheet prepared according to the above-described method for manufacturing a hot-rolled steel sheet of the present disclosure, and may include welding the hot-rolled steel sheet manufactured according to the above method to obtain a steel pipe; and annealing the steel pipe.

Preparation of Steel Pipe

The hot-rolled steel sheet manufactured according to the method for manufacturing a hot-rolled steel sheet of the present disclosure described above may be welded to obtain a steel pipe.

The hot-rolled steel sheet or hot-rolled pickled steel sheet may be used to prepare a steel pipe, for example, by an electrical resistance welding process or the like.

Annealing of Steel Pipe

The steel pipe obtained by making the above-mentioned pipe may be heat-treated by annealing.

The present disclosure may further include drawing the annealed steel pipe. The steel pipe may be Cold drawn to reduce a diameter of the steel pipe. The drawing process may be a cold drawing process.

In the present disclosure, the hot-rolled steel sheet or hot-rolled pickled steel sheet may be manufactured by using a conventional cold forming process including a forming process, an anneal heating process, and a cold drawing process, for example, by an electrical resistance welding process or the like to prepare a small-diameter steel pipe.

The annealing of the steel pipe may be performed for 3 to 60 minutes at a temperature within a range of $Ac_1-50°$ C. to $Ac_3+150°$ C. The annealing may include a furnace cooling process and an air cooling process.

Hereinafter, a member and a method of manufacturing the same according to another preferred aspect of the present disclosure will be described.

A member according to another preferred aspect of the present disclosure may be manufactured by using the steel pipe of the present disclosure as described above, and may have the alloy composition of the steel pipe of the present disclosure described above, and a microstructure including, by volume, 90% or more of one or two of martensite and tempered martensite, and 10% or less retained austenite.

When a fraction of martensite and tempered martensite is less than 90%, there is a problem that it may be difficult to secure a yield strength of 1400 MPa or more or a tensile strength of 1800 MPa or more to be targeted. When the content of the retained austenite exceeds 10%, it may act as a fatigue crack site to deteriorate fatigue durability.

The member according to the present disclosure may have a tensile strength×elongation value of 20,000 MPa % or more, excellent resistance to hydrogen penetration from an external source, such as a corrosive environment, and ultra-high-strength after heat treatment.

The member may have a yield strength of 1400 MPa or more and a tensile strength of 1800 MPa or more.

A method of manufacturing a member according to another preferred aspect of the present disclosure may include annealing and drawing the steel pipe obtained according to the method for manufacturing a steel pipe of the present disclosure; hot-forming the drawn steel pipe to obtain a member; and quenching or quenching and tempering the member.

Preparation of Member

The drawn steel pipe as described above may be hot-formed to obtain a member.

The member maybe obtained, for example, by heating a steel pipe having a specific length to a temperature within a range of 900 to 980° C., maintaining isothermally within 60 to 1000 seconds, extracting the heated steel pipe, and hot-forming the extracted steel pipe using a mold or the like.

The heating the steel pipe to a temperature within a range of 900 to 980° C. may be to austenitize a microstructure of a steel pipe component and to make the component uniform. When the heating temperature within a range of the steel pipe is less than 900° C., a temperature largely decreases during hot-rolling and quenching heat treatment, and ferrite may be formed on a surface of the steel pipe, to be difficult to secure sufficient strength after heat treatment. When the heating temperature within a range of the steel pipe exceeds 980° C., a size of an austenitic grain of the steel pipe may increase, or decarburization may occur on inner/outer walls of the steel pipe, to deteriorate fatigue strength of a final component. Moreover, when heated above the above temperature range, it may be difficult to secure target strength after heat treatment of the final component. Therefore, it is desired to limit the heating temperature within a range of the steel pipe to a temperature within a range of 900 to 980° C.

In addition, in order to secure sufficient heat treatment strength and prevent decarburization, heat treatment may be performed in a time range of 60 to 1000 sec.

When the heating (maintenance) time is less than sec, it may be difficult to ensure uniform component distribution and structure. When the heating (maintenance) time exceeds 1000 sec, it may be difficult to prevent grain growth or decarburization. Therefore, it is desired to limit time maintained at the heating temperature to 60 to 1000 sec.

Quenching or Quenching and Tempering of Member

The member obtained by the above hot-forming operation may be quenched or quenched and tempered.

In a quenching operation, a heating temperature may be 900 to 980° C.

In the quenching operation, the hot-formed member may be immersed directly in, for example, an oil coolant to perform an oil cooling operation to 200° C. or less for forming a martensitic phase structure.

The hot-formed member may be immersed directly in a water coolant to perform a water cooling operation to 200° C. or less for forming a martensitic phase structure. In this case, there may be a problem in that hydrogen in the member is trapped in defects such as excessive dislocation or the like introduced during the water cooling operation, not to be completely discharged to the outside of the member even when tempering the member. Therefore, in the quenching operation of the member of the present disclosure, the oil cooling operation may be preferable because natural aging of a predetermined time or more may be required after the water cooling operation.

As described above, the member obtained through the hot-forming operation may be subjected to the quenching operation using water+oil coolant or an oil coolant. The quenching operation may be to make a structure of the hot-formed member (component) have a martensite phase, and immerse the hot-formed component in the oil coolant to quench (rapid cool) the hot-formed component, to make a temperature within a range of the member (component) to be 200° C. or less. In this case, the cooling rate may be, for example, 10 to 70° C./sec at a temperature within a range of Ms (martensite transformation start temperature) to Mf (martensite transformation end temperature).

In the range of the Ms to Mf temperature range, when the cooling rate is less than 10° C./sec, it may be difficult to form the martensite phase. When the cooling rate exceeds 70° C./sec, the martensite phase may be excessively formed due to rapid cooling deviation of inner/outer wall of the steel pipe. Therefore, dimensional deviation in which a shape of a steel pipe component changes, and poor manufacturing of components such as quench cracks, or the like may be likely to occur. Particularly, these may be remarkable on a steel sheet or a member (component) that exhibits tensile properties after heat treatment of 1800 MPa or more. In this case, in order to minimize defects in manufacturing of the component, it is desirable to limit the cooling rate of the member to a temperature within a range of 10 to 70° C./sec, in the Ms to Mf temperature range.

In addition, it is more preferable to limit the cooling rate to 20 to 60° C./sec in order to effectively secure the tensile strength after heat treatment of the member. In order to secure the cooling rate, oil maybe used by increasing a temperature within a range of the oil from room temperature to relatively high temperature.

In the present disclosure, the member may be subjected only to the quenching operation as described above. Alternatively, after the quenching operation as described above, it maybe subjected to a tempering operation in order to impart toughness.

The tempering operation may be performed by maintaining the quenched member (component) at a tempering temperature within a range of 170 to 250° C. for 600 to 3600 seconds.

When the tempering temperature is less than 170° C., it may be difficult to secure a tensile strength×elongation value of 20,000 or more. When the tempering temperature exceeds 250° C., temper embrittlement or tempered martensite embrittlement in which the total elongation or uniform elongation due to coarse cementite precipitation in the component is rapidly decreased may also occur. Therefore, it is desired to limit the tempering temperature within a range of the member to 170 to 250° C.

In addition, after sufficient heat treatment, in order to secure a tensile strength-elongation balance of 20,000 or more, it is desired to maintain at a tempering temperature within a range of 170 to 250° C. for 600 to 3600 seconds.

When the maintenance time is less than 600 seconds, there may be no significant change in dislocation density introduced to the martensitic structure of the quenched component. Therefore, the tensile strength may be very high. When the maintenance time exceeds 3600 seconds, the elongation may be very high, and it may be difficult to secure strength after heat treatment. Therefore, it is desired to limit the time maintained at the tempering temperature to a range of 600 to 3600 seconds.

In a method of manufacturing a member according to the present disclosure, a member having a tensile strength× elongation value of 20,000 or more, having excellent resistance to hydrogen penetration from an external source, such as a corrosive environment, and having an ultra-high-strength after heat treatment may be provided.

Mode for Invention

Hereinafter, the present disclosure will be described in more detail through the following Example.

EXAMPLE

Steels having alloying compositions as shown in Tables 1 and 2 were used, the steels were hot-rolled under the conditions shown in Table 3 to prepare hot-rolled steel sheets having a thickness of 3 mm, and the hot-rolled steel sheets were then pickled. Slabs manufactured before the hot-rolling operation were heated and homogenized for 200 minutes at a temperature within a range of 1200±20° C., and, subsequently, the slabs were individually subjected to a rough rolling operation and a finishing rolling operation at a temperature within a range of 600~700° C., to prepare hot-rolled steel sheets having a thickness of 3 mm.

In Table 1 and Table 2, Inventive Steels 1 to 5 satisfied relationships 1 and 2, and Cu+Ni were 1.1% or more. Comparative Steel 1 did not satisfy relationships 1 and 2, and Cu+Ni were less than 1.1%, and Comparative Steel 2 satisfied relationships 1 and 2, and Cu+Ni were less than 1.1%. Ms temperature was calculated by using an empirical formula, Ms =539−423C−30.4Mn−12.1Cr−17.7Ni−7.5Mo.

A microstructure, yield strength (YS), tensile strength (TS), elongation (EL) and tensile strength (TS) x elongation (EL) of the hot-rolled steel sheet prepared as described above were measured, and the results therefrom were shown in Table 3 below. The microstructure other than ferrite was pearlite.

The hot-rolled steel sheets were pickled. In this case, a portion of the pickled hot rolled steel sheets were treated by using an electrical resistance welding operation to prepare 28 mm diameter steel pipes, and subsequently the steel pipes were subject to an annealing operation and a cold drawing operation to prepare 23.5 mm diameter drawn steel pipes. At this time, annealing temperature was 721° C. The steel pipes were subjected to a heating operation, a hot-forming operation, and a quenching operation, or a heating operation, a hot-forming operation, a quenching operation, and a tempering operation, under the conditions shown in Table 4 below, to prepare members.

At this time, the quenching operation was performed by heating the steel pipes to a temperature within a range of 930 to 950° C. and immersing the heated steel pipes in an oil coolant for 200 sec, to cool temperature ranges of the members to 200° C. or less, and, as needed, to be completely cooled to room temperature.

Yield strength (YS), tensile strength (TS), elongation (EL), yield ratio (YR), tensile strength (TS) x elongation (EL), hydrogen diffusion time, a microstructure, and austenite grain size (AGS) for each of the members manufactured as described above were measured, and the results therefrom were shown in Table 5 below.

Mechanical properties of the hot-rolled steel sheets and the members were measured by taking JIS 5 specimens in a direction, parallel to a rolling direction at a width w/4 point.

Hydrogen diffusion coefficient was calculated by finely polishing a surface layer of each of specimens having a thickness of 3 mm, loading the specimen into a solution in which 3.5% NaCl+a relatively small amount of $Na_4SCN$ were added to each of the specimens, applying a cathodic current of −1 $mA/cm^2$ to permeate hydrogen into each of the specimens, and measuring amounts of hydrogen injected and amounts of hydrogen released to determine hydrogen diffusion time (breakthrough time). The calculation of the hydrogen diffusion coefficient used formula, Dapp=(thickness)$^2$/(15.3×Breakthrough Time).

The microstructures of the members were observed by using quantitative analysis equipment including an optical microscope, a scanning electron microscope, a transmission electron microscope, an electron back scattering diffraction (EBSD), or an X-ray diffractometer (XRD).

Tensile curves for Inventive Materials 1 to 5 and Comparative Materials 1 and 2 were illustrated in FIG. 1.

In addition, optical microscopic structures of Inventive Materials 1 and 2 and Comparative Materials 1 and 2 were observed, and the results therefrom were shown in FIGS. 2 to 5, FIG. 2 showed an optical microscopic microstructure of Inventive Material 1, FIG. 3 showed an optical microscopic microstructure of Inventive Material 2, FIG. 4 showed an optical microscopic microstructure of Comparative Material 1, and FIG. 5 showed an optical microscopic microstructure of Comparative Material 2. In this case, the captured optical microscope structures were optical microscope microstructures observed after etching martensite phases of the heat-treated members with picric acid.

TABLE 1

| Steel | C | Si | Mn | P | S | S.Al | Cr | Mo | Ti | Cu | Ni | B | N |
|---|---|---|---|---|---|---|---|---|---|---|---|---|---|
| *IS1 | 0.420 | 0.091 | 1.000 | 0.009 | 0.029 | 0.029 | 0.196 | 0.101 | 0.029 | 0.096 | 1.220 | 0.0019 | 0.0037 |
| IS2 | 0.430 | 0.092 | 1.030 | 0.010 | 0.028 | 0.028 | 0.200 | 0.102 | 0.031 | 1.212 | 0.099 | 0.0022 | 0.0043 |
| IS3 | 0.487 | 0.093 | 1.010 | 0.010 | 0.025 | 0.025 | 0.200 | 0.104 | 0.032 | 0.100 | 1.210 | 0.0003 | 0.0043 |
| IS4 | 0.545 | 0.091 | 0.901 | 0.010 | 0.021 | 0.022 | 0.198 | 0.103 | 0.030 | 0.102 | 1.220 | 0.0020 | 0.0033 |
| IS5 | 0.530 | 0.095 | 0.912 | 0.009 | 0.023 | 0.035 | 0.200 | 0.103 | 0.032 | 0.100 | 1.500 | 0.0020 | 0.0044 |
| **CS1 | 0.4 | 0.360 | 0.809 | 0.009 | 0.0019 | 0.031 | 0.195 | 0.001 | 0.030 | 0.300 | 0.310 | 0.0019 | 0.0041 |
| CS2 | 0.544 | 0.093 | 0.909 | 0.009 | 0.0019 | 0.026 | 0.200 | 0.100 | 0.030 | 0.101 | 0.915 | 0.0019 | 0.0036 |

*IS: Inventive Steel,
**CS: Comparative Steel

TABLE 2

| Steel | Ceq | Ms Temp. (° C.) | Relationship 1 (Mn/Si) | Relationship 2 (Ni/Si) |
|---|---|---|---|---|
| *IS1 | 0.69 | 308 | 11.0 | 13.4 |
| IS2 | 0.67 | 323 | 11.2 | 1.1 |
| IS3 | 0.76 | 280 | 10.9 | 13.0 |
| IS4 | 0.79 | 258 | 9.9 | 13.4 |
| IS5 | 0.79 | 259 | 9.6 | 15.8 |
| **CS1 | 0.65 | 318 | 2.2 | 0.9 |
| CS2 | 0.79 | 264 | 9.8 | 9.8 |

*IS: Inventive Steel,
**CS: Comparative Steel

TABLE 3

| Steel | Slab Heating Temp. (° C.) | Finish Rolling Temp. (° C.) | Coiling Temp. (° C.) | Ferrite Fraction (%) | YS (Mpa) | TS (Mpa) | EL (%) | TS × EL (Mpa %) |
|---|---|---|---|---|---|---|---|---|
| *IS1 | 1230 | 870 | 680 | 23.9 | 483 | 717 | 21 | 15057 |
| IS2 | 1200 | 880 | 650 | 28.5 | 492 | 710 | 21 | 14910 |
| IS3 | 1200 | 860 | 620 | 12.4 | 481 | 748 | 20 | 14960 |
| IS4 | 1210 | 880 | 620 | 11.5 | 456 | 758 | 21 | 15918 |
| IS5 | 1200 | 870 | 700 | 8.9 | 472 | 772 | 19 | 14668 |
| **CS1 | 1200 | 860 | 700 | 12.9 | 446 | 725 | 22 | 15950 |
| CS2 | 1200 | 870 | 700 | 27.5 | 394 | 645 | 23 | 14835 |

*IS: Inventive Steel,
**CS Comparative Steel

TABLE 4

| Steel | Specimen No. | Heating Temp. (° C.) | Cooling Rate (° C./sec) | Tempering Temp. (° C.) |
|---|---|---|---|---|
| *IS1 | ***IM 1 | 930 | 20 | 200 |
| IS2 | IM2 | 930 | 25 | 200 |
| IS3 | IM3 | 930 | 20 | 200 |
| IS4 | IM4 | 930 | 25 | 220 |
| IS5 | IM5 | 950 | 20 | 200 |
| **CS1 | ****CM1 | 930 | 20 | 200 |
| CS2 | CM2 | 930 | 20 | 200 |

*IS: Inventive Steel,
**CS: Comparative Steel,
***IM: Inventive Material,
****CM: Comparative Material

TABLE 5

| Specimen No. | YS (Mpa) | TS (Mpa) | EL (%) | YR | TS × EL (Mpa %) | Hydrogen Diffusion Coefficient (m$^2$/sec) | Retained Austenite Fraction (%) | AGS (μm) |
|---|---|---|---|---|---|---|---|---|
| *IM1 | 1441 | 1891 | 14.5 | 0.76 | 27420 | 4.909 × 10$^{-11}$ | 3.7 | 26.3 |
| IM2 | 1485 | 1920 | 12.2 | 0.77 | 23424 | 5.646 × 10$^{-11}$ | 3.2 | 10.1 |
| IM3 | 1497 | 2026 | 13.1 | 0.74 | 26541 | 4.985 × 10$^{-11}$ | 4.3 | 18.7 |

TABLE 5-continued

| Specimen No. | YS (Mpa) | TS (Mpa) | EL (%) | YR | TS × EL (Mpa %) | Hydrogen Diffusion Coefficient (m²/sec) | Retained Austenite Fraction (%) | AGS (μm) |
|---|---|---|---|---|---|---|---|---|
| IM4 | 1520 | 2164 | 10.4 | 0.70 | 22506 | $4.855 \times 10^{-11}$ | 6.1 | 21.1 |
| IM5 | 1416 | 2160 | 10.9 | 0.66 | 23544 | $4.803 \times 10^{-11}$ | 6.1 | 13.4 |
| ****CM1 | 1511 | 2202 | 10.1 | 0.69 | 22240 | $5.814 \times 10^{-11}$ | 6.5 | 17.1 |
| CM2 | 1519 | 1989 | 9.0 | 0.76 | 17901 | $5.970 \times 10^{-11}$ | 4.2 | 21.6 |

***IM: Inventive Material,
****CS: Comparative Material

As shown in Tables 1 to 5, it can be seen that Inventive Materials 1 to 5 according to the present disclosure had tensile strength×elongation values of 20,000 MPa % or more, and hydrogen diffusion coefficient values of less than $5.80 \times 10^{-11}$.

In Inventive Materials 1 to 5, hydrogen diffusion coefficient values decreased. In these cases, it may be judged that the decrease may be because hydrogen forcedly injected thereinto may relatively inhibit itself from penetrating into the heat-treated members, in a corrosive environment by a ultra fine thin surface rich layer present on a specimen surface layer in an initial period of a corrosion stage and/or dense corrosion products formed on the specimen surface layer after the corrosion stage. In addition, as shown in the comparison results between Inventive Materials 1 and 2, inhibitory effect on hydrogen penetration seemed that the nickel (Ni) element was more effective than the copper (Cu) element.

As shown in Table 5, it can be seen that fractions of retained austenite of Inventive Materials 1 to 5 were 7% or less, and were lower than or similar to those of Comparative Materials 1 and 2.

Therefore, the lower values for the hydrogen diffusion coefficient identified in the members of Inventive Steels showed that the lower values were due to suppression of hydrogen penetration by formation of the Ni—Cu rich layer and/or the dense corrosion products, formed on the specimen surface layer, rather than the fact in which the hydrogen amount penetrated from the specimen surface of the tempered martensite into the inside thereof was increased than that captured at an interface of the retained austenite.

It can be seen that Comparative Material 1, not fall within the present disclosure, had a tensile strength×elongation value of 20,000 MPa % or more, but had a hydrogen diffusion coefficient value of $5.80 \times 10^{-11}$ or more, and Comparative Material 2, not fall within the present disclosure, had a tensile strength×elongation value of 20, 000 MPa % or less, and had a hydrogen diffusion coefficient value of $5.80 \times 10^{-11}$ or more.

As illustrated in FIG. 1, in a different manner to Inventive Materials 1 to 5 having relatively high elongations, Comparative Materials 1 and 2 had relatively low elongations or relatively high hydrogen diffusion coefficients. Therefore, it may be judged that Comparative Materials 1 and 2 had a relatively low inhibitory effect on hydrogen penetration to have relatively high possibility for generating hydrogen embrittlement.

As illustrated in FIGS. 2 to 5, it can be seen that Inventive Materials 1 and 2 had relatively large AGS due to the relatively large amounts of nickel (Ni) or copper (Cu), or had relatively small AGS due to the presence of Cu precipitates, compared to those of Comparative Materials 1 and 2.

While example embodiments have been shown and described above, it will be apparent to those skilled in the art that modifications and variations could be made without departing from the scope of the present disclosure as defined by the appended claims.

The invention claimed is:

1. A hot-rolled steel sheet for a hot press member comprising, by weight, C: 0.43 to 0.60%, Mn: 0.7 to 1.5%, Si: 0.3% or less (excluding 0%), P: 0.03% or less (including 0%), S: 0.004% or less (including 0%), Al: 0.04% or less (excluding 0%), Cr: 0.3% or less (excluding 0%), Mo: 0.3% or less (excluding 0%), Ni: 0.099 to 1.5%, Cu: 0.096 to 1.5%, Cu+Ni: 1.1% or more, Ti: 0.04% or less (excluding 0%), B: 0.005% or less (excluding 0%), N: 0.006% or less (excluding 0%), and a balance of Fe and impurities, wherein the alloying element satisfies the following relationships 1 and 2, the hot-rolled steel sheet includes a microstructure comprising, by volume, 7 to 30% of ferrite and 70 to 93% of pearlite, and the hot-rolled steel sheet has a tensile strength of 710 MPa or more:

(Mn/Si)≥3 (weight ratio)   [Relationship 1]

15.8≥(Ni/Si)≥1 (weight ratio)   [Relationship 2]

2. The hot-rolled steel sheet for a hot press member according to claim 1, wherein the hot-rolled steel sheet has a tensile strength of 710 to 1000 MPa.

3. The hot-rolled steel sheet for a hot press member according to claim 1, comprising, by weight, C: 0.487 to 0.60%.

4. The hot-rolled steel sheet for a hot press member according to claim 1, comprising, by weight, Mn: 0.7 to 0.912%.

5. The hot-rolled steel sheet for a hot press member according to claim 1, comprising, by weight, Ni: 1.21 to 1.5%.

* * * * *